United States Patent
Ko

(10) Patent No.: US 10,037,141 B2
(45) Date of Patent: Jul. 31, 2018

(54) MEMORY DEVICE AND MEMORY SYSTEM INCLUDING THE SAME

(71) Applicant: SK hynix Inc., Icheon-si, Gyeonggi-do (KR)

(72) Inventor: Jae Bum Ko, Suwon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 14/834,524

(22) Filed: Aug. 25, 2015

(65) Prior Publication Data

US 2016/0283120 A1  Sep. 29, 2016

(30) Foreign Application Priority Data

Mar. 23, 2015 (KR) .................. 10-2015-0040262

(51) Int. Cl.
*G06F 3/06* (2006.01)

(52) U.S. Cl.
CPC .......... *G06F 3/0607* (2013.01); *G06F 3/0634* (2013.01); *G06F 3/0685* (2013.01)

(58) Field of Classification Search
CPC ..... G06F 3/0604; G06F 3/0659; G06F 3/0679
See application file for complete search history.

(56) References Cited

U.S. PATENT DOCUMENTS

| 4,446,534 | A * | 5/1984 | Smith | G11C 8/12 327/525 |
| 7,193,432 | B1 * | 3/2007 | Schmit | H03K 19/17756 257/774 |
| 7,492,623 | B2 * | 2/2009 | Lee | G11C 7/1045 365/225.7 |
| 2009/0231897 | A1 * | 9/2009 | Ryu | G11C 29/12005 365/51 |
| 2014/0281456 | A1 * | 9/2014 | Mejia | G06F 21/575 713/2 |

OTHER PUBLICATIONS

Kakamanshadi, Gholmareza; "Decoders," Jul. 2013.*
Introduction to Computer Science, Lecture Notes, CMPS 10 Summer 2011, Online: https://classes.soe.ucsc.edu/cmps010/Summer11/HW3.pdf.*

* cited by examiner

*Primary Examiner* — Ramon A. Mercado
(74) *Attorney, Agent, or Firm* — William Park & Associates Ltd.

(57) ABSTRACT

A memory device may include an application chip set including a plurality of applications. The memory device may include a chip decoder configured to select one application among the applications in response to input data and a test fuse signal, and output function data so that a function to be performed by the selected application is selected.

16 Claims, 4 Drawing Sheets

MEMORY DEVICE AND MEMORY SYSTEM INCLUDING THE SAME

CROSS-REFERENCE TO RELATED APPLICATIONS

This application is based on and claims priority from Korean Patent Application No. 10-2015-0040262, filed on Mar. 23, 2015 with the Korean Intellectual Property Office, the disclosure of which is incorporated herein in its entirety by reference.

BACKGROUND

1. Technical Field

The present application relates to a memory device and a memory system including the same, and more particularly, to a memory device for supporting a multi-application, and a memory system including the same.

2. Related Art

A memory system may include a memory device and a memory controller controlling the memory device. The memory device may include an application or an application chip set including multiple applications. The memory device includes a chip decoder for selecting an application and selecting a function to be performed by the selected application.

The chip decoder selects an application by using firmware supported according to the application, and in a memory device including the application chip set, the chip decoder uses firmware appropriate to each application. For example, the application chip set may include a Solid State Drive (SSD), a Multimedia Card (MMC), a Secure Digital Card (SD), Micro Secure Digital Card MSD) a memory Stick, an Embedded Multimedia Card (eMMC), a Perfect Page NAND (PPN), and Double Data Rate 3 (DDR3), and may include two or more applications among them. The applications have different electric characteristics and operation characteristics, so that a controller includes firmware for controlling each of the applications.

However, in order to use various firmware, manufacturing costs of the memory devices may increase, and test costs and the like for each firmware may increase.

SUMMARY

According to an embodiment there may be provided a memory device. The memory device may include an application chip set including a plurality of applications. The memory device may include a chip decoder configured to select one application among the applications in response to input data and a test fuse signal, and may output function data so that a function to be performed by the selected application is selected.

According to an embodiment there may be provided a memory system. The memory system may include a memory device configured to select one application among a plurality of applications by using one firmware, and may be configured so that a function to be performed by the selected application is selected. The memory system may include a memory controller configured to control the memory device.

DETAILED DESCRIPTION

Hereinafter, an various examples of embodiments will be described with reference to the accompanying drawings. However, the various embodiments are not limited to the embodiments disclosed below, but various forms different from each other may be implemented. The embodiments are provided to be completely known to those skilled in the art.

The various embodiments may provide a memory device capable of driving multiple applications by one firmware, and a memory system including the same.

According to the examples of the embodiments, it may be possible to drive multiple applications with one firmware, thereby decreasing manufacturing costs and test costs of a memory device due to an increase in the number of firmware.

Figure 1:
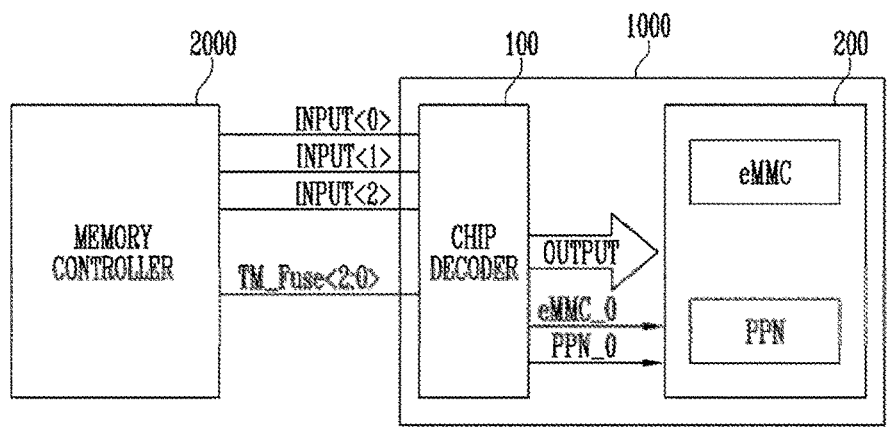
FIG. 1 is a block diagram illustrating a representation of an example of a memory system according to an embodiment.

FIG. 1 is a block diagram illustrating a representation of an example of a memory system according to an embodiment.

Referring to FIG. 1, a memory system 10000 may include a memory device 1000 and a memory controller 2000. The memory controller 2000 may be used to control the memory device 1000. The memory device 1000 may include a chip decoder 100 and an application chip set 200. The memory device 1000 may use one firmware for controlling the application chip set 200. The chip decoder 100 may output selection signals eMMC_O and PPN_O for selecting one application among many other applications included in the application chip set 200 in response to $0^{th}$ to second input data INPUT<2:0> and a test fuse signal TM_Fuse<2:0>, and function data OUTPUT for a function to be performed by a selected application. The test fuse signal TM_Fuse<2:0>, is a signal internally generated by the memory controller 2000. The test fuse signal TM_Fuse<2:0> may be set according to an application included in the memory device 1000. An application may also be selected by a fuse cutting method and the like, instead of the test fuse signal TM_Fuse<2:0>. Among the methods, the method using the test fuse signal TM_Fuse<2:0> will be described as an example of an embodiment.

The application chip set 200 may include a plurality of applications. For example, the application chip set 200 may include an Embedded Multimedia Card (eMMC) and a Perfect Page NAND (PPN). The eMMC and the PPN correspond to an example for describing an embodiment, and other applications, other than the eMMC and the PPN, may be included. In the present example of an embodiment, a case where two applications are included in the application chip set 200 will be described as an example.

Figure 2:
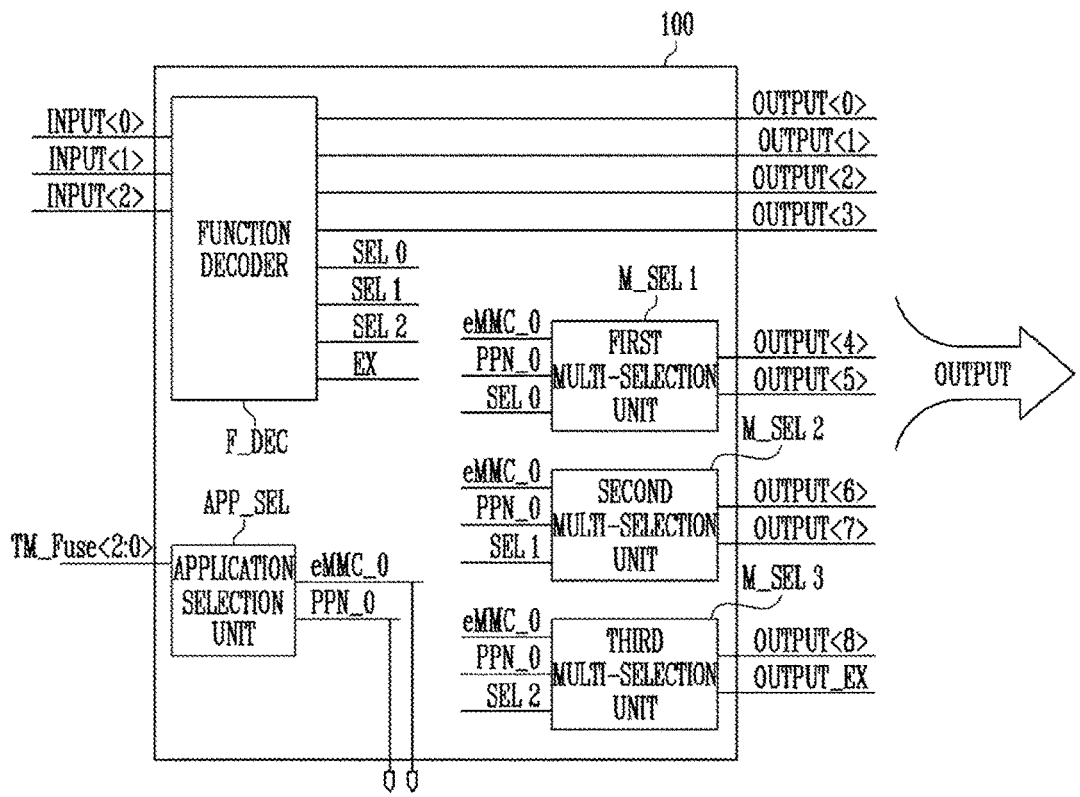
FIG. 2 is a diagram for describing a representation of an example of a chip decoder of FIG. 1.

FIG. 2 is a diagram for describing a representation of an example of the chip decoder of FIG. 1.

Referring to FIG. 2, the chip decoder 100 may include a function decoder F_DEC, an application selection unit APP_SEL, and first to third multi-selection units M_SEL1 to M_SEL3 for driving a selected application among the various applications by using one firmware.

The function decoder F_DEC outputs $0^{th}$ to third function data OUTPUT<3:0>, $0^{th}$ to second decoding signals SEL<2:0>, and an extra signal EX according to the $0^{th}$ to second input data INPUT<2:0>. The function decoder F_DEC activates only any one bit among the $0^{th}$ to third function data OUTPUT<3:0>, the $0^{th}$ to second decoding signals SEL<2:0>, and the extra signal EX according to the $0^{th}$ to second input data INPUT<2:0>, and inactivates the remaining bits. For example, the activation of the bit means 1 for data and high for a signal. For example, the inactivation of the bit means 0 for data and low for a signal. The $0^{th}$ to third function data OUTPUT<3:0>, the $0^{th}$ to second decoding signals SEL<2:0>, and the extra signal EX may be differently set according to a function. For example, the $0^{th}$ to third function data OUTPUT<3:0> may be set as data for a function commonly performed by the applications. For example, when the chip decoder 100 outputs any one of the $0^{th}$ to third function data OUTPUT<3:0>, the eMMC application or the PPN application performs a function corresponding to function data output among A0 to A8 functions. The A0 to A8 functions will be discussed below.

When the eMMC application and the PPN application perform different functions with the $0^{th}$ to second input data INPUT<2:0> input into the function decoder F_DEC, the application selection unit APP_SEL is configured as a circuit for selecting the eMMC application or the PPN application. For example, the application selection unit APP_SEL outputs selection signals eMMC_O and PPN_O in response to the test fuse signal TM_Fuse<2:0>. In an example where a function is performed by selecting any one of the two applications, the test fuse signal TM_Fuse<2:0> may include signals including three bits. A signal of two bits among the signals of three bits may be used as a signal for selecting an application, and the remaining signal of one bit may be used as an enable signal for selecting an application. First to third multiple selection units ML_SEL1 to ML_SEL3 output fourth to eights function data OUTPUT<8:4> and extra data OUTPUT_EX according to the selection signals eMMC_O and PPN_O and the $0^{th}$ to second decoding signals SEL<2:0>. For example, the first to third multiple selection units ML_SEL1 to ML_SEL3 output all of the fourth to eights function data OUTPUT<8:4> and the extra data OUTPUT_EX as "0" when all of the selection signals eMMC_O and PPN_O and the $0^{th}$ to second decoding signals SEL<2:0> are "0", and in other examples, the first to third multiple selection units ML_SEL1 to ML_SEL3 output the fourth to eights function data OUTPUT<8:4> including "1". The extra data OUTPUT_EX may be data, which is not used by a semiconductor system, or may be set as data corresponding to a corresponding application when a function is added to a selected application.

An operation of the aforementioned chip decoder 100 will be described below.

It may be assumed that the functions performable by the eMMC application of FIG. 1 are functions A0, A1, A2, A3, A4, A6, and A8, and the functions performable by the PPN application are functions A0, A1, A2, A3, A5, and A7. Among them, the functions A0, A1, A2, and A3 are functions commonly performed by the eMMC application and the PPN application, so that a selected application between the eMMC application and the PPN application performs the function A0, A1, A2, or A3 according to the $0^{th}$ to third function data OUTPUT<3:0>. For example, the functions A4, A6, and A8 are functions performed only when the eMMC application is selected, so that the eMMC application performs the function A4, A6, or A8 according to the fourth, sixth, or eighth function data OUTPUT<4>, OUTPUT<6>, or OUTPUT<8>. For example, the functions A5 and A7 are functions performed only when the PPN application is selected, and the PPN application performs the function A5 or A7 according to the fifth or seventh function data OUTPUT<5> or OUTPUT<7>.

An operation of outputting the function data OUTPUT will be described below with reference to Table 1 below.

TABLE 1

| INPUT | | | OUTPUT | Function | Function |
|---|---|---|---|---|---|
| <2> | <1> | <0> | "1" | (eMMC) | (PPN) |
| 0 | 0 | 0 | <0> | A0 | A0 |
| 0 | 0 | 1 | <1> | A1 | A1 |
| 0 | 1 | 0 | <2> | A2 | A2 |
| 0 | 1 | 1 | <3> | A3 | A3 |
| 1 | 0 | 0 | <4> or <5> | A4 | A5 |
| 1 | 0 | 1 | <6> or <7> | A6 | A7 |
| 1 | 1 | 0 | <8> | A8 | — |
| 1 | 1 | 1 | EX | — | — |

Referring to Table 1, the chip decoder 100 outputs function data OUTPUT corresponding to a function to be performed by the eMMC application or the PPN application according to the input data INPUT<2:0> When it is assumed that the functions A0, A1, A2, and A3 correspond to the common function of the eMMC application and the PPN application, and when the input data INPUT is '000', '001', '010', or '011', the selected application between the eMMC application and the PPN application performs the function A0, A1, A2, or A3. When the input data INPUT is "100", the eMMC application performs the function A4 or the PPN application performs the function A5. That is, when the input data INPUT is "100", the different function is performed according to the selected application. When the input data INPUT is "101", the eMMC application performs the function A6 or the PPN application performs the function A7. Even in this example, the input data INPUT is equally "101", but the different function is performed according to the selected application. When the input data INPUT is "110", the eMMC application performs the function A8 or the PPN application does not perform the function. That is, in an example where the input data INPUT is equally "110" and a function to be performed by the PPN application is not set, even though the PPN application is selected, when the input data INPUT is equally "110", the PPN application does not perform the function. However, when the input data INPUT is equally "110", the eMMC application may perform the function A8. When the input data INPUT is "111", the eMMC and PPN applications do not perform the function. The function performed by the selected application according to the input data INPUT may be differently set according to the type of applications.

As described above, in order to perform a different function according to a selected application even though the same input data INPUT is input, different function data OUTPUT needs to be further output according to the selected application, and to this end, the application selection unit APP_SEL and the first to third multiple selection units M_SEL1 to M_SEL3 are included in the chip decoder 100.

The function data OUTPUT output according to the input data INPUT will be described below.

When the input data INPUT is '000', '001', '010', or '011', the selection signals eMMC_O and PPN_O are output as "0" regardless of the test fuse signal TM_Fuse<2:0>. Further, when the input data INPUT is '000', '001', '010', or '011', the decoding signals SEL0 to SEL2 and the extra signal EX output from the function decoder F_DEC are "0", so that the first to third multi selection units M_SEL1 to M_SEL3 output the fourth to eighth function data OUTPUT<8:4> and the extra data OUTPUT_EX. Accordingly, when the input data INPUT is '000', '001', '010', or '011', only data of any one among the $0^{th}$ to third function data OUTPUT<3:0> output from the function decoder F_DEC is "1", and all of the remaining function data is "0".

A method of outputting the function data OUTPUT when the input data INPUT is '100', '101', '110', or '111' will be described with reference to Table 2 below.

TABLE 2

| INPUT | eMMC_S | PPN_S | EN | eMMC_O | PPN_O | SEL <0> | <1> | <2> | OUTPUT "1" | Function (eMMC) | Function (PPN) |
|---|---|---|---|---|---|---|---|---|---|---|---|
| 100 | 1 | 0 | 1 | 1 | 0 | 1 | 0 | 0 | <4> | A4 | — |
| 101 | 1 | 0 | 1 | 1 | 0 | 0 | 1 | 0 | <6> | A6 | — |
| 110 | 1 | 0 | 1 | 1 | 0 | 0 | 0 | 1 | <8> | A8 | — |
| 111 | 1 | 0 | 1 | 1 | 0 | 0 | 0 | 0 | — | — | — |
| 100 | 0 | 1 | 1 | 0 | 1 | 1 | 0 | 0 | <5> | — | A5 |
| 101 | 0 | 1 | 1 | 0 | 1 | 0 | 1 | 0 | <7> | — | A7 |
| 110 | 0 | 1 | 1 | 0 | 1 | 0 | 0 | 1 | EX | — | — |
| 111 | 0 | 1 | 1 | 0 | 1 | 0 | 0 | 0 | — | — | — |

Referring to Table 2, when the input data INPUT is '100', '101', '110', or '111', an enable signal EN included in the test fuse signal TM_Fuse<2:0> is 1, so that the application selection unit APP_SEL is activated.

When the eMMC application is selected, the application selection unit APP_SEL outputs an eMMC selection signal eMMC_O as "1" and a PPN selection signal PPN_O as "0" in response to the test fuse signal TM_Fuse<2:0>.

When the input data INPUT is "100", a $0^{th}$ decoding signal SEL0 is output as "1", and the first and second decoding signals SEL1 and SEL2 and the extra signal EX are output as "0". When the eMMC selection signal eMMC_O is "1", the PPN selection signal PPN_O is "0", and the $0^{th}$ decoding signal SEL0 is "1", the first multi selection unit M_SEL1 outputs the fourth function data OUTPUT<4> as "1". In this example, the remaining function data is output as "0". When the fourth function data OUTPUT<4> is "1", the eMMC application performs a function E.

When the input data INPUT is "101", the first decoding signal SEL1 is output as "1", and the $0^{th}$ and second decoding signals SEL0 and SEL2 and the extra signal EX are output as "0". When the eMMC selection signal eMMC_O is "1", the PPN selection signal PPN_O is "0", and the first decoding signal SEL1 is "1", the second multi selection unit M_SEL2 outputs the sixth function data OUTPUT<6> as "1". In this example, the remaining function data is output as "0". When the sixth function data OUTPUT<6> is output as "1", the eMMC application performs a function F.

When the input data INPUT is "110", the second decoding signal SEL2 is output as "1", and the $0^{th}$ and first decoding signals SEL0 and SEL1 and the extra signal EX are output as "0". When the eMMC selection signal eMMC_O is "1", the PPN selection signal PPN_O is "0", and the second decoding signal SEL2 is "1", the third multi selection unit M_SEL3 outputs the eighth function data OUTPUT<8> as "1". In this example, the remaining function data is output as "0". When the eighth function data OUTPUT<8> is output as "1", the eMMC application performs the function A8.

When the input data INPUT is "111", the extra signal EX output from the function decoder F_DEC is output as "1".

When the PPN application is selected, the application selection unit APP_SEL outputs the eMMC selection signal eMMC_O as "0" and the PPN selection signal PPN_O as "1" in response to the test fuse signal TM_Fuse<2:0>.

When the input data INPUT is "100", a $0^{th}$ decoding signal SEL0 is output as "1", and the first and second decoding signals SEL1 and SEL2 and the extra signal EX is output as "0". When the PPN selection signal PPN_O is "1", the eMMC selection signal eMMC_O is "0", and the $0^{th}$ decoding signal SEL0 is "1", the first multi selection unit M_SEL1 outputs the fifth function data OUTPUT<5> as "1". In this example, the remaining function data is output as "0". When the fifth function data OUTPUT<5> is "1", the PPN application performs the function A5.

When the input data INPUT is "101", the first decoding signal SEL1 is output as "1", and the $0^{th}$ and second decoding signals SEL0 and SEL2 and the extra signal EX are output as "0". When the PPN selection signal PPN_O is "1", the eMMC selection signal eMMC_O is "0", and the first decoding signal SEL0 is "1", the second multi selection unit M_SEL2 outputs the seventh function data OUTPUT<7> as "1". In this example, the remaining function data is output as "0". When the seventh function data OUTPUT<7> is "1", the PPN application performs the function A7.

When the input data INPUT is "110" or "111", a function to be performed by the PPN application is not set, the PPN application does not perform a function.

As described above, even though the input data INPUT is the same, various functions may be performed according to the selected application.

Figure 3:
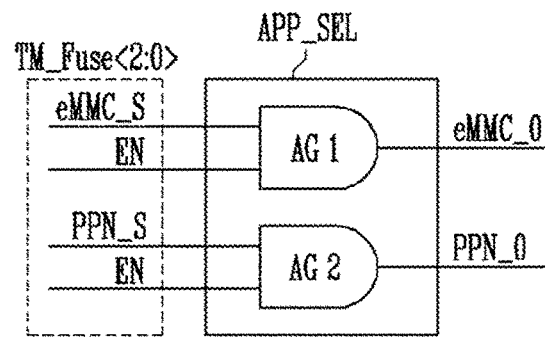
FIG. 3 is a diagram for describing a representation of an example of an application selection unit of FIG. 2.

FIG. 3 is a diagram for describing a representation of an example of the application selection unit of FIG. 2.

Referring to FIG. 3, the application selection unit APP_SEL may be implemented with various configurations. For example, the application selection unit APP_SEL may be implemented as an encoder for outputting the selection signals eMMC_O and PPN_O in response to the test fuse signal TM_Fuse<2:0>. For example, the test fuse signal TM_Fuse<2:0> may include an eMMC application signal eMMC_S for selecting the eMMC application, the PPN application signal PPN_S, and the enable signal EN. The application selection unit APP_SEL may include logic gates, for example, a first AND gate AG1 and a second AND gate AG2. The first AND gate AG1 outputs the eMMC selection signal eMMC_O according to the eMMC application signal eMMC_S and the enable signal EN. The second AND gate AG2 outputs the PPN selection signal PPN_O according to the PPN application signal PPN_S and the enable signal EN. For example, the first AND gate AG1 outputs the eMMC selection signal eMMC_O as "1" when all of the eMMC application signal eMMC_S and the enable signal EN are "1", and outputs the eMMC selection signal eMMC_O as "0" when at least one of the eMMC application signal eMMC_S and the enable signal EN is "0". The second AND gate AG2 outputs the PPN selection signal PPN_O as "1" when all of the PPN application signal PPN_S and the enable signal EN are "1", and outputs the PPN selection signal PPN_O as "0" when at least one of the PPN application signal PPN_S and the enable signal EN is "0".

In the aforementioned example of an embodiment, the structure in which the two applications eMMC and PPN are included in the application chip set 200 (see FIG. 1) has been described as an example, but two or more applications may also be included in the application chip set 200. This will be described below.

Figure 4:
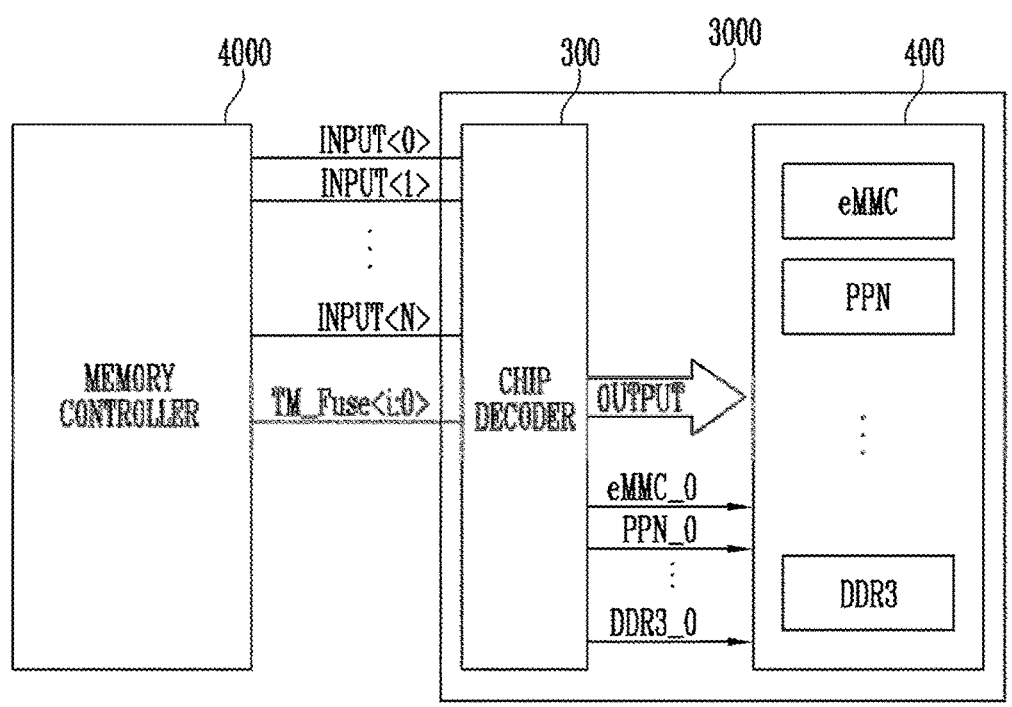
FIG. 4 is a diagram for describing a representation of an example of a memory system according to an embodiment.

FIG. 4 is a diagram for describing a representation of an example of a memory system according to an embodiment.

Referring to FIG. 4, a memory system 20000 may include a memory device 3000 and a memory controller 4000 controlling the memory device 3000. The memory device 2000 may include a chip decoder 300 and an application chip set 400. The memory device 3000 may use one firmware for controlling the application chip set 400. The chip decoder 300 may output selection signals eMMC_O, PPN_O, . . . , and DDR3_O for selecting one application among applications included in the application chip set 400 in response to $0^{th}$ to $N^{th}$ input data INPUT<N:0> (N is a positive integer) and a test fuse signal TM_Fuse<i:0> (i is a positive integer), and function data OUTPUT for a function to be performed by a selected application. The test fuse signal TM_Fuse<i:0>, which is a signal internally generated by the memory controller 4000, may be set according to an application included in the memory device 3000 during a test operation. Otherwise, an application may also be selected by a fuse cutting method and the like, instead of the test fuse signal TM_Fuse<i:0>. Among the methods, the method using the test fuse signal TM_Fuse<i:0> will be described as an example of an embodiment.

The application chip set 400 may include a plurality of applications. For example, the application chip set 400 may include applications, such as, for example but not limited to, an Embedded Multimedia Card (eMMC), a Perfect Page NAND (PPN), and DDR3. The eMMC, the PPN, and the DDR3 correspond to examples for describing the embodiment, and various applications may also be included. In the present example of an embodiment, a case where three or more applications may be included in the application chip set 400 will be described as an example.

Figure 5:
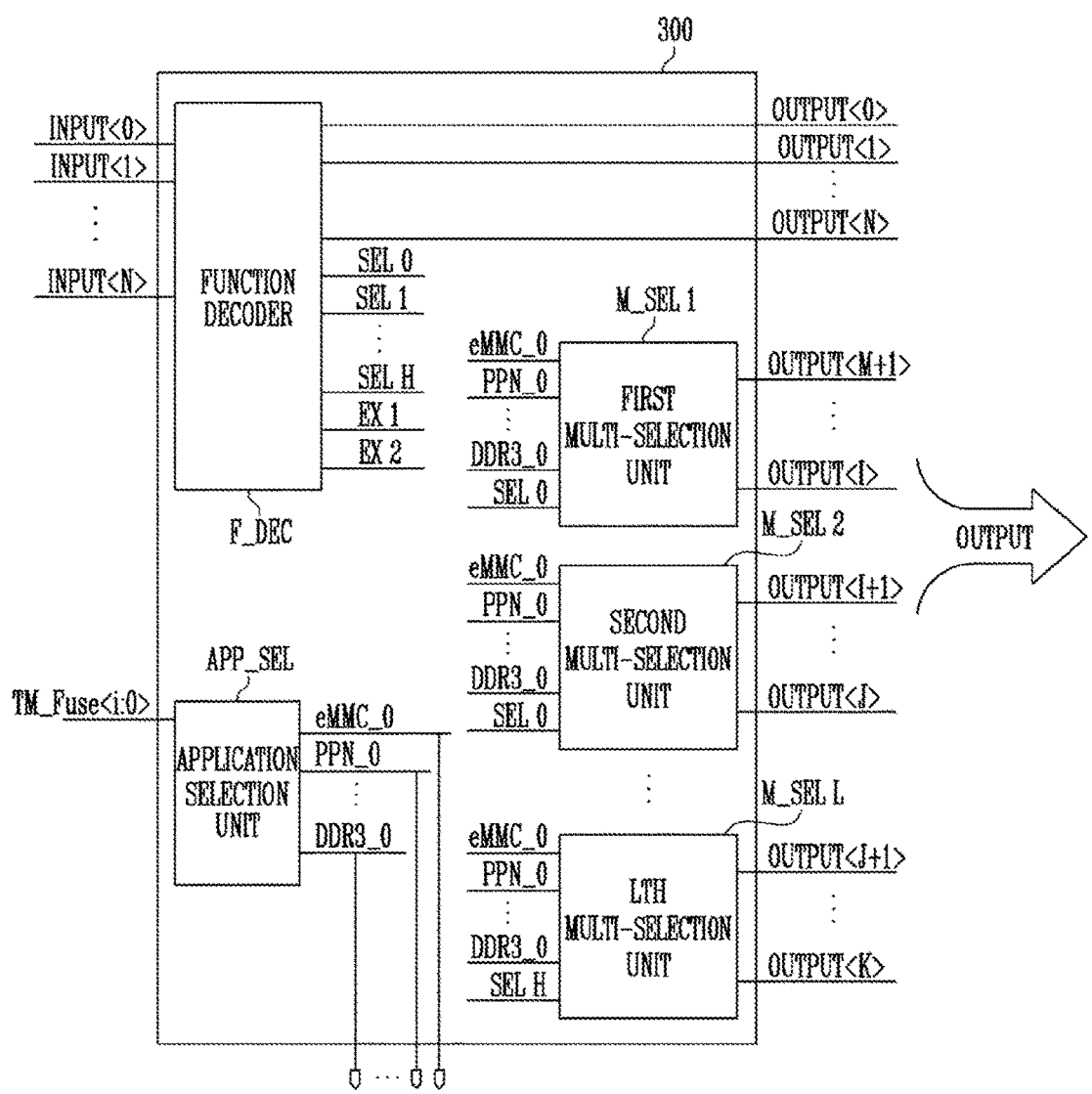
FIG. 5 is a diagram for describing a representation of an example of a chip decoder of FIG. 4.

FIG. 5 is a diagram for describing a representation of an example of the chip decoder of FIG. 4.

Referring to FIG. 5, the chip decoder 300 may include a function decoder F_DEC, an application selection unit APP_SEL, and first to $L^{th}$ multiple selection units M_SEL1 to M_SELL (L is a positive integer) for driving a selected application among the various application by using one firmware.

The function decoder F_DEC outputs $0^{th}$ to $M^{th}$ function data OUTPUT<M:0>, $0^{th}$ to $H^{th}$ decoding signals SEL<H:0> (H is a positive integer), and extra signals EX1 and EX2 according to the $0^{th}$ to $N^{th}$ input data INPUT<N:0>. The $0^{th}$ to $M^{th}$ function data OUTPUT<M:0>, the $0^{th}$ to $H^{th}$ decoding signals SEL<H:0>, and the extra signals EX1 and EX2 may be differently set according to a function. For example, the $0^{th}$ to $M^{th}$ function data OUTPUT<M:0> may be set as data for a function commonly performed by the applications. For example, when the chip decoder 300 outputs any one of the $0^{th}$ to $M^{th}$ function data OUTPUT<M:0> as "1", a selected application among the eMMC application, the PPN application, . . . , and the DDR3 application perform a function corresponding to function data output among B0 to BM functions.

When the applications perform different functions with the $0^{th}$ to $N^{th}$ input data INPUT<N:0> applied to the function decoder F_DEC, the application selection unit APP_SEL is configured as a circuit for selecting any one of the eMMC to DDR3 applications. For example, the application selection unit APP_SEL outputs selection signals eMMC_O, PPN_O, . . . , and DDR3_O in response to the test fuse signal TM_Fuse<i:0>. The test fuse signal TM_Fuse<i:0> may include a plurality of bits, and the number of bits may be set in proportional to the number of applications.

The first to $L^{th}$ multiple selection units ML_SEL1 to ML_SELL output an $M+1^{th}$ to $K^{th}$ function data OUTPUT<K:M+1> according to the selection signals eMMC_O, PPN_O, . . . , and DDR3_O and the $0^{th}$ to $H^{th}$ decoding signals SEL<H:0>. For example, the first to $L^{th}$ multiple selection units ML_SEL1 to ML_SELL output all of the $M+1^{th}$ to $K^{th}$ function data OUTPUT<K:M+1> as "0" when all of the selection signals eMMC_O and PPN_OeM-MC_O, PPN_O, . . . , and DDR3 and the $0^{th}$ to $H^{th}$ decoding signals SEL<H:0> are "0", and in other examples, the first to $L^{th}$ multiple selection units ML_SEL1 to ML_SELL output the $M+1^{th}$ to $K^{th}$ function data OUTPUT<K:M+1> including "1". Some of the $M+1^{th}$ to $K^{th}$ function data OUTPUT<K:M+1> may also be used as extra data depending on the memory device 3000.

An operation of an embodiment of the aforementioned chip decoder 300 will be described below.

It may be assumed that functions performable by the eMMC application of FIG. 4 are B0, B1, . . . , BM, BM+1, BI+1, and BJ+1 (I and J are different positive integers), and functions performable by the DDR3 application of FIG. 4 are B0, B1, . . . , BM, BI, BJ, and BK. Among them, the functions B0, B1, . . . , and BM are functions commonly performed by the eMMC application, the PPN application, . . . , and the DDR3 application, so that a selected application among the eMMC application, the PPN application, . . . , and the DDR3 application performs one function among the functions B0 to BM according to the $0^{th}$ to $M^{th}$ function data OUTPUT<M:0>. The functions BM+1, BI+1, and BJ+1 are functions performed only by the eMMC application, so that the eMMC application performs the functions BM+1, BI+1, or BJ+1 according to the M+1, I+1, or J+1 function OUTPUT<M+1>, OUTPUT<I+1>, or OUTPUT<J+1>. The functions BI, BJ, . . . , and BK are functions performed only by the DDR3 application, so that the DDR3 application performs the function BI, BJ, . . . , or K according to the $I^{th}$, $J^{th}$, . . . , and $K^{th}$ function data OUTPUT<I>, OUTPUT<J>, . . . , or OUTPUT<K>.

As described above, in order to perform a different function according to a selected application even though the same input data INPUT is input into the chip decoder 300, different function data OUTPUT needs to be further output according to the selected application, and to this end, the application selection unit APP_SEL and the first to L$^{th}$ multiple selection units M_SEL1 to M_SELL are included in the chip decoder 300.

Figure 6:
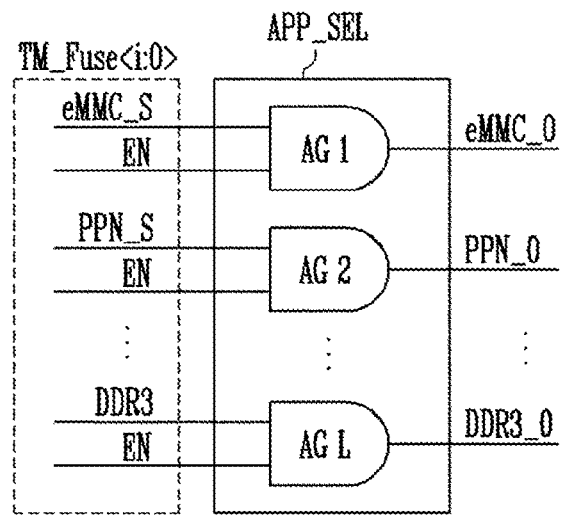
FIG. 6 is a diagram for describing a representation of an example of an application selection unit of FIG. 5.

FIG. 6 is a diagram for describing a representation of an example of the application selection unit of FIG. 5.

Referring to FIG. 6, the application selection unit APP_SEL may be implemented with various configurations. For example, the application selection unit APP_SEL may be implemented as an encoder for outputting the selection signals eMMC_O, PPN_O, . . . , and DDR3_O in response to the test fuse signal TM_Fuse<i:0>. For example, the test fuse signal TM_Fuse<i:0> may include an eMMC application signal eMMC_S for selecting the eMMC application, the PPN application signal PPN_S, . . . , a DDR3 application signal DDR3_S for selecting the DDR3 application, and the enable signal EN. The application selection unit APP_SEL may include logic gates, for example, first AND gates AG1 to AGL. The first AND gate AG1 outputs the eMMC selection signal eMMC_O according to the eMMC application signal eMMC_S and the enable signal EN. The second AND gate AG2 outputs the PPN selection signal PPN_O according to the PPN application signal PPN_S and the enable signal EN. The L$^{th}$ AND gate AGL outputs the DDR3 selection signal DDR3_O according to the DDR3 application signal DDR3_S and the enable signal EN. Accordingly, the first AND gate AG1 outputs the eMMC selection signal eMMC_O as "1" when all of the eMMC application signal eMMC_S and the enable signal EN are "1", and outputs the eMMC selection signal eMMC_O as "0" when at least one of the eMMC application signal eMMC_S and the enable signal EN is "0". The second AND gate AG2 outputs the PPN selection signal PPN_O as "1" when all of the PPN application signal PPN_S and the enable signal EN are "1", and outputs the PPN selection signal PPN_O as" "0 when at least one of the PPN application signal PPN_S and the enable signal EN is "0". The L$^{th}$ AND gate AGL outputs the DDR3 selection signal DDR3_O as "1" when all of the DDR3 application signal DDR3_S and the enable signal EN are "1", and outputs the DDR3 selection signal DDR3_O as "0" when at least one of the DDR3 application signal DDR3_S and the enable signal EN is "0".

As described above, even though three or more applications are included in the application chip set 400 (see FIG. 4), it may be possible to perform various functions without increasing the number of input pins.

Figure 7:
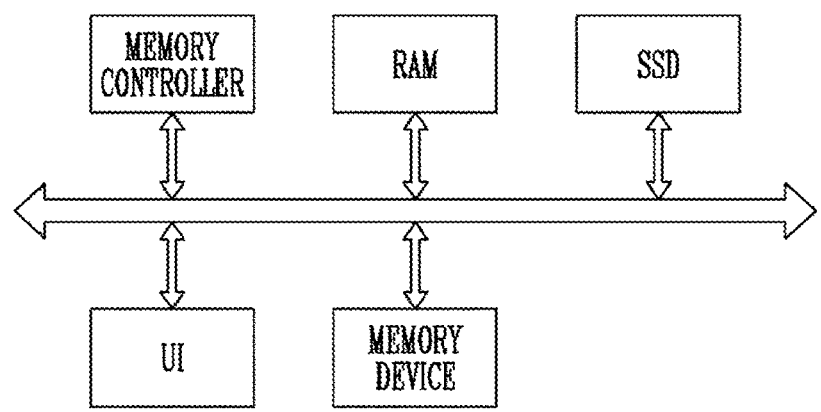
FIG. 7 is a diagram for describing a representation of an example of an embodiment of a memory system adopting the memory device according to the various embodiments described herein.

FIG. 7 is a diagram for describing a representation of an example of an embodiment of a memory system adopting the memory device according to the various embodiments described herein.

Referring to FIG. 7, a memory system 30000 may include a memory controller, a RAM, an SSD, a user interface UI, and a memory device which are electrically connected through a bus. The memory system 30000 may be included in a computing system, such as a notebook computer and a personal computer, and may also be included in a Personal Digital Assistance (PDA), a digital camera, a game device, and the like.

As described above, the embodiments have been disclosed in the drawings and the specification. The specific terms used herein are for purposes of illustration, and do not limit the scope of the present application defined in the claims. Accordingly, those skilled in the art will appreciate that various modifications and other equivalent examples may be made without departing from the scope and spirit of the present disclosure. Therefore, the sole technical protection scope of the present application will be defined by the technical spirit of the accompanying claims.

What is claimed is:

1. A memory device, comprising:
    an application chip set including a plurality of applications; and
    a chip decoder configured to select an application among the applications using firmware, and drive the selected application,
    wherein the chip decoder comprising:
        a function decoder to output first function data for common functions of the applications, and decoding signals for different functions of the applications by decoding a plurality of input signals;
        an application selection unit to output selection signals for the different functions by decoding a plurality of test fuse signals; and
        a plurality of multiple selection units to output second function data for the different functions in response to the decoding signals and the selection signals,
    wherein the firmware controls the applications respectively in response to the first and second function data.

2. The memory device of claim 1, wherein the function decoder activates only any one bit among the first function data and the decoding signals according to the input signals.

3. The memory device of claim 2, wherein the activated one bit is a high signal for the decoding signals.

4. The memory device of claim 2, wherein an inactivated bit is a low signal for the decoding signals.

5. The memory device of claim 1, wherein the application selection unit includes an encoder outputting the selection signals according to the test fuse signals.

6. The memory device of claim 5, wherein the test fuse signals include a plurality of bits for application signals and an enable signal.

7. The memory device of claim 6, wherein the application selection unit includes logic gates for outputting the selection signals according to the application signals and the enable signal, respectively.

8. The memory device of claim 1, wherein the multi-selection units inactivate all of the second function data according to the selection signals and the decoding signals, or activate only one bit of any one among the second function data and inactivate remaining bits.

9. A memory device comprising:
    a function decoder to output first function data for common functions of a plurality of applications, and decoding signals for different functions of the applications by decoding a plurality of input signals;
    an application selection unit to output selection signals for the different functions by decoding a plurality of test fuse signals for selecting one of the applications; and
    a plurality of multiple selection units to output second function data for the different functions in response to the decoding signals and the selection signals.

10. The memory device of claim 9, wherein the function decoder activates only any one bit among the first function data and the decoding signals according to the input signals.

11. The memory device of claim 10, wherein the activated one bit is a high signal for the decoding signals.

12. The memory device of claim 10, wherein an inactivated bit is a low signal for the decoding signals.

13. The memory device of claim 9, wherein the application selection unit includes an encoder outputting the selection signals according to the test fuse signals.

14. The memory device of claim 13, wherein the test fuse signals include a plurality of bits for application signals and an enable signal.

15. The memory device of claim 14, wherein the application selection unit includes logic gates for outputting the selection signals according to the application signals and the enable signal, respectively.

16. The memory device of claim 9, wherein the multi-selection units inactivate all of the second function data according to the selection signals and the decoding signals, or activate only one bit of any one among the second function data and inactivate remaining bits.

* * * * *